United States Patent
Ezawa et al.

[11] Patent Number: 6,016,963
[45] Date of Patent: Jan. 25, 2000

[54] INTEGRATED CIRCUIT CARD WITH MEANS FOR PERFORMING RISK MANAGEMENT

[75] Inventors: Kazuo J. Ezawa, Clinton, N.J.; Michael Foster, Orpington, United Kingdom

[73] Assignee: Mondex International Limited, London, United Kingdom

[21] Appl. No.: 09/012,349

[22] Filed: Jan. 23, 1998

[51] Int. Cl.⁷ .................................................. G06K 19/06
[52] U.S. Cl. ..................... 235/492; 235/379; 235/380; 902/26
[58] Field of Search ................................ 235/492, 379, 235/380, 381, 382, 382.5, 451; 902/25, 26

[56] References Cited

U.S. PATENT DOCUMENTS

| | | | |
|---|---|---|---|
| 4,454,414 | 6/1984 | Benton | 235/379 |
| 4,583,182 | 4/1986 | Breddan | 364/492 |
| 4,614,861 | 9/1986 | Pavlov et al. | 235/380 |
| 4,630,201 | 12/1986 | White | 235/379 X |
| 4,634,845 | 1/1987 | Hale et al. | 235/379 X |
| 5,177,342 | 1/1993 | Adams | 235/379 |
| 5,221,838 | 6/1993 | Gutman et al. | 235/379 |
| 5,521,362 | 5/1996 | Powers | 235/380 |

FOREIGN PATENT DOCUMENTS

| | | |
|---|---|---|
| WO9854667 | 12/1998 | WIPO . |
| WO9854677 | 12/1998 | WIPO . |

OTHER PUBLICATIONS

EMV '96 Integrated Circuit Card Application Specification for Payment Systems, Version 3.0, Jun. 30, 1996.

*Primary Examiner*—Michael G Lee
*Attorney, Agent, or Firm*—Baker & Botts, LLP

[57] ABSTRACT

A microprocessor-based device having a memory unit and a processing unit operatively coupled to the memory unit. The memory unit has one or more risk parameters stored therein, and the processing unit is capable of performing real-time risk management analysis of transactions performed by the IC card using the risk parameters. Preferably, the microprocessor-based device is an IC card.

27 Claims, 9 Drawing Sheets

INTEGRATED CIRCUIT CARD WITH MEANS FOR PERFORMING RISK MANAGEMENT

BACKGROUND OF THE INVENTION

This invention relates to a method for containing the economic risk of fraudulent transactions conducted using microprocessor-based devices by implementing risk management on such devices. In a preferred embodiment of the present invention, the microprocessor-based devices are integrated circuit ("IC") cards, or "smart cards" as they are also commonly known.

Commerce involving IC cards is becoming increasingly commonplace. To support widespread commerce using such cards, it is critical that measures be established to prevent, detect, and contain counterfeiting and other fraudulent transactions on such cards.

The prevention of fraud has been addressed by the IC card industry by employing such measures as, for example, the authentication, verification, and authorization of transactions using cryptographic keys. Traditionally, to detect fraudulent activity that circumvents these preventive measures, the IC card industry has employed risk management analysis of IC card transactions. Two widely used methods of risk management analysis in the telecommunications and financial industries are the calculation of the "velocity" of transactions and the calculation of the statistical signature of transactions. The velocity method monitors the amount and number of transactions per a unit of time against preset maximum limits. The statistical signature method, on the other hand, monitors transactions on IC cards against past transactional patterns at multiple levels of use of IC cards (i.e., from the level of use of a single IC card to higher levels of use of IC cards, such as regional levels). While the statistical signature method is usually more robust and effective than the velocity method, the statistical signature method is also more computationally intensive and requires more infrastructure support than the velocity method.

To date, risk management analysis of IC card transactions has been performed exclusively on centralized computer systems. While generally effective, this traditional approach to risk management has some serious drawbacks. First, the analysis of IC transaction data on centralized computers requires the collection of a voluminous amount of data. The collection of such a voluminous amount of data requires a significant technical and economic investment in equipment and infrastructure to properly route transactional data from the point of transaction to the centralized computer system.

A second drawback is that the number of fraudulent transactions, at least in the early stages of a fraudulent transaction "attack," is very small in relation to the total number of legitimate transactions in a group of IC cards. Therefore, attempting to locate fraudulent transactions from among valid ones is truly a difficult task, comparable to finding the proverbial needle in a haystack.

Finally, even assuming the technical and economic challenges can be overcome, there are significant inherent delays in the traditional approach to risk management. These delays are associated with the collection and processing of the voluminous amount of data previously mentioned. Because of these delays, the response time for containment of the fraudulent transactions is limited. Clearly, because the ability to respond as quickly as possible to fraudulent threats is crucial to the containment of fraud, delays in response time are highly undesirable.

Accordingly, there exists a need for an approach to risk management of fraudulent transactions that is more economical, more efficient, and faster than the traditional approach.

SUMMARY OF THE INVENTION

The present invention is directed to microprocessor-based devices for conducting transactions, such as IC cards, which have risk management functionality implemented thereon. The advantages of employing risk management on microprocessor-based devices are many-fold. First, the use of risk management on these devices allows for more timely and effective detection and response to fraudulent activity. In contrast to the traditional approach, which may take days to collect the transactional data to be analyzed at a central facility, a microprocessor-based device having risk management functionality implemented thereon may analyze its own transactions in real-time as they occur and may take appropriate responses in real-time. Second, the use of risk management on a microprocessor-based device allows for the data processing of transactions to be made more efficient. Instead of processing a hundred million transactions a day by a central facility, each individual microprocessor-based device may process its own transactions, typically a few a day. Third, the risk management functionality on a microprocessor-based device may be protected by the physical security of the device. For example, the circuitry of IC cards is usually contained in tamper-resistant packages. Fourth, even when the physical security of a microprocessor-based device is compromised, the use of risk management on a microprocessor-based device allows for the continuous monitoring of transactions. Although it is true that the risk management functionality of a device may be disabled if the device's physical security is compromised, the risk management functionality of other microprocessor-based devices will continue to function. Because a counterfeiter needs to interact with legitimate devices to obtain any economic benefit, the risk management functionality on other devices may detect and contain the counterfeit activity. Finally, the use of risk management on a microprocessor-based device is more cost-effective than risk management processing by a central facility because the former does not require the investment in infrastructure that the latter requires.

In accordance with the present invention, a microprocessor-based device comprises a memory unit having stored therein one or more risk parameters, and a processing unit operatively coupled to the memory unit for performing real-time risk management analysis of transactions performed by the microprocessor-based device using the one or more risk parameters. The microprocessor-based device may be a general purpose computer.

In accordance with a preferred embodiment of the present invention, the microprocessor-based device is an IC card. The IC card comprises a memory unit having stored therein one or more risk parameters, and a processing unit operatively coupled to the memory unit for performing real-time risk management analysis of transactions performed by the IC card using the one or more risk parameters.

The processing unit may include means for resetting the one or more risk parameters when the IC card is in communication with a terminal in contact with a host system of an issuer of the IC card.

In a first preferred embodiment of the IC card in accordance with the present invention, the risk parameters comprise a cumulative transaction amount total and a cumulative transaction amount limit. The processing unit comprises means for updating the cumulative transaction amount total with the amount of a transaction performed by the IC card and means for comparing the cumulative transaction amount total to the cumulative transaction amount limit.

In a second preferred embodiment of the IC card in accordance with the present invention, the risk parameters comprise a number of transactions counter and a number of transactions limit. The processing unit comprises means for updating the number of transactions counter based on transactions performed by the IC card and means for comparing the number of transactions counter to the number of transactions limit.

In a third preferred embodiment of the IC card in accordance with the present invention, the risk parameters comprise a transaction amount limit per transaction, and the processing unit comprises means for comparing the amount of a transaction performed by the IC card to the transaction amount limit per transaction.

In a fourth preferred embodiment of the IC card in accordance with the present invention, the risk parameters comprise one or more transaction turnover ratios. Preferably, the one or more transaction turnover ratios are either credit or debit turnover ratios.

In a fifth preferred embodiment of the IC card in accordance with the present invention, the risk parameters comprise a transaction amount limit, a transaction turnover ratio limit, and a current transaction turnover ratio. The processing unit comprises first processing means for computing the ratio of the amount of a transaction performed by the IC card to the transaction amount limit, second processing means for updating the current transaction turnover ratio with the ratio computed by the first processing means, and third processing means for comparing the current transaction turnover ratio with the transaction turnover ratio limit.

In a sixth preferred embodiment of the IC card in accordance with the present invention, the risk parameters comprise: one or more transaction amount limits, each transaction amount limit corresponding to a transaction currency; one or more transaction turnover ratio limits, each turnover ratio limit corresponding to a transaction type; and one or more current transaction turnover ratios, each current transaction turnover ratio corresponding to a transaction type. The processing unit comprises: computing means for computing the ratio of the amount of a transaction performed by the IC card to the transaction amount limit corresponding to the transaction currency of the transaction; first updating means for updating the current transaction turnover ratio corresponding to the transaction type for the transaction with the ratio computed by the computing means; and first comparing means for comparing the current transaction turnover ratio with the turnover ratio limit corresponding to the transaction type of the transaction.

With regard to the sixth embodiment, it is preferred that the risk parameters further comprise a transaction counter and that the processing unit further comprises second updating means for updating the transaction counter based on the number of transactions performed by the IC card.

It is also preferred that the risk parameters further comprise a reset interval and that the processing unit further comprises second comparing means for comparing the transaction counter with the reset interval and reset means for resetting the transaction counter and the one or more current transaction turnover ratios based on the result of the second comparing means.

It is further preferred that the risk parameters further comprise a reset counter and that the processing unit further comprises third updating means for updating the reset counter each time the transaction counter is reset.

It is further preferred that the risk parameters further comprise transaction qualification parameters and that the processing unit further comprises means for determining whether a transaction performed by the IC card satisfies the transaction qualification parameters and means for bypassing the second updating means if the transaction does not satisfy the transaction qualification parameters.

It is further preferred that the processing unit further comprises disabling means for disabling at least part of the functionality of the IC card based on the results of the first comparing means.

In yet another preferred embodiment, an IC card in accordance with the present invention has a memory unit that comprises lock activation log areas for writing a lock activation log each time the disabling means disables at least part of the functionality of the IC card. Preferably, the processing unit further comprises means for disabling the entire functionality of the IC card when a predetermined number of the lock activation logs are written into the log activation log areas.

In accordance with the present invention, a method for conducting a transaction with an IC card is provided, in which the IC card comprises a memory unit with one or more risk parameters stored therein. The method comprises: initiating a transaction with said IC card; performing real-time risk management analysis of said transaction using said one or more risk management parameters; and completing said transaction based on the results of said risk management analysis.

In accordance with the present invention, a method for detecting fraud within an IC card system is also provided. The IC card system comprises a plurality of IC cards, each IC card comprising a memory area for storing one or more risk parameters, and a processing unit for performing real-time risk management analysis of transactions using the risk parameters. The method provided comprises: reading one or more of the risk parameters from one or more of the IC cards; performing statistical analysis on the read risk parameters; and comparing the results of the statistical analysis with one or more of the risk parameters of one or more of the IC cards.

In accordance with the present invention, a method for performing a transaction between an IC card and a compatible device is also provided. The compatible device may be an IC card. The IC card comprises a memory unit and a processing unit, the memory unit having one or more risk parameters stored therein and one or more lock activation log areas for storing lock activation logs. The method comprises: detecting potential fraud by performing real-time risk management analysis of the transaction using the risk parameters by the processing unit; writing a lock activation log in one of the log activation log areas; and transmitting a signal to the compatible device to write a the lock activation log in the compatible device. The step of transmitting a signal may comprise either transmitting a copy of the lock activation log written in the IC card or transmitting a signal instructing the compatible device to create a lock activation log itself.

Preferably, in the method just described, the memory unit further comprises a write-success flag area, and the method further comprises the step of writing a positive indication in the write-success flag area if the compatible device indicates the lock activation log was successfully written, or writing a negative indication in the write-success flag area if the compatible device indicates the lock activation log was not written or the compatible device does not respond to the transmission of the lock activation log.

In accordance with the present invention, a method for containing potentially fraudulent transactions in an IC card system is also provided. The IC card system comprises one or more IC cards, each IC card comprising a memory unit having risk parameters stored therein, and a processing unit for performing real-time risk management analysis of transactions using said risk parameters, and one or more terminals for communicating with said one or more IC cards. The method comprises: detecting potentially fraudulent transactions involving one or more of said IC cards; and transmitting commands to said one or more IC cards through said one or more terminals to change said risk parameters.

With regard to this last method, it is preferred that the memory unit further comprises classification fields, and the step of transmitting commands comprises selectively targeting one or more of the IC cards using the classification fields. It is also preferred that the method further comprise a hierarchal communications network with a control center connected to the top level of the network and the one or more terminals connected at lower levels of the network below the control center. In this embodiment, the step of transmitting commands comprises transmitting commands from the control center to the one or more IC cards through the hierarchal communications network to change the risk parameters.

These and other features, aspects, and advantages of the present invention will become better understood with regard to the following detailed description, appended claims, and accompanying drawings.

DETAILED DESCRIPTION

The present invention will be described mainly with reference to IC cards because of the prevalence and importance of such cards in commerce. It should be understood, however, that the present invention encompasses any microprocessor-based device that is capable of being used in commerce. Moreover, although the risk parameters of the following exemplary embodiments are described with reference to credit transactions, it should be understood that the claimed invention is not limited to such risk parameters or transactions, but may encompass any type of risk parameter or transaction. For example, in addition to credit risk parameters and credit transactions, the present invention may encompass debit risk parameters and debit transactions.

Figure 1:
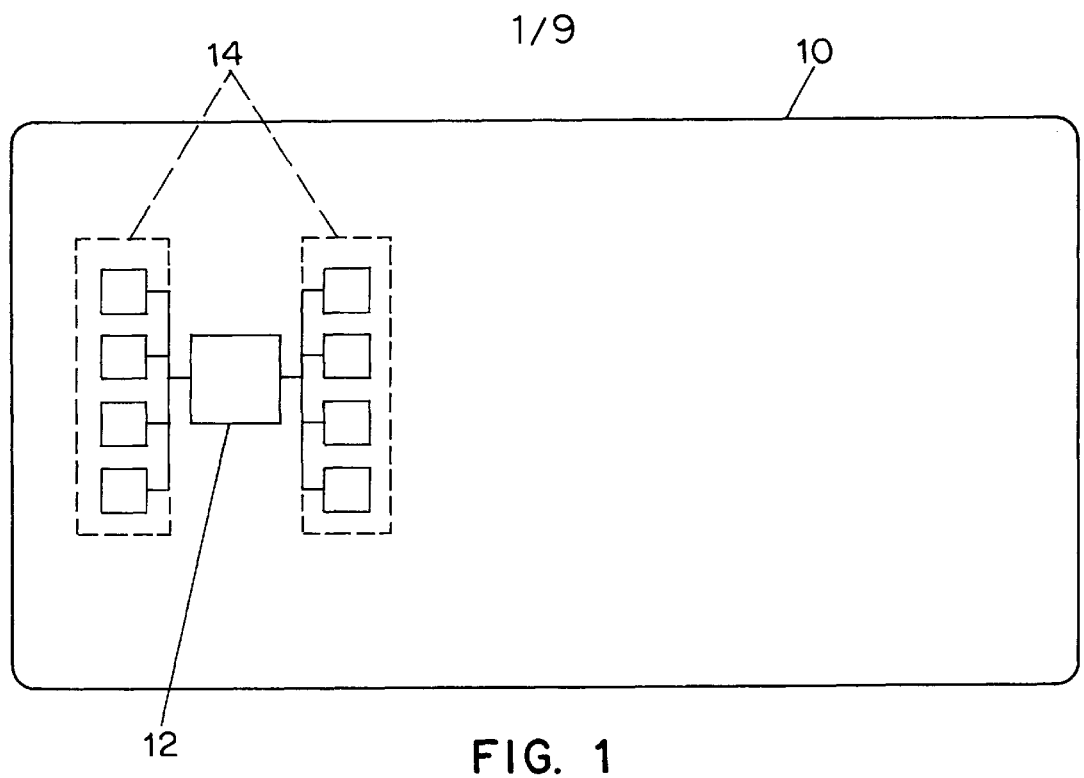
FIG. 1 is a schematic representation of an IC card in accordance with a preferred embodiment of the present invention.

FIG. 1 provides a schematic representation of a typical IC card 10. The IC card 10 includes an integrated circuit 12 and one or more electrical contacts 14, connected to the integrated circuit 12, for communication between the integrated circuit 12 and devices outside the IC card 10.

Figure 2:
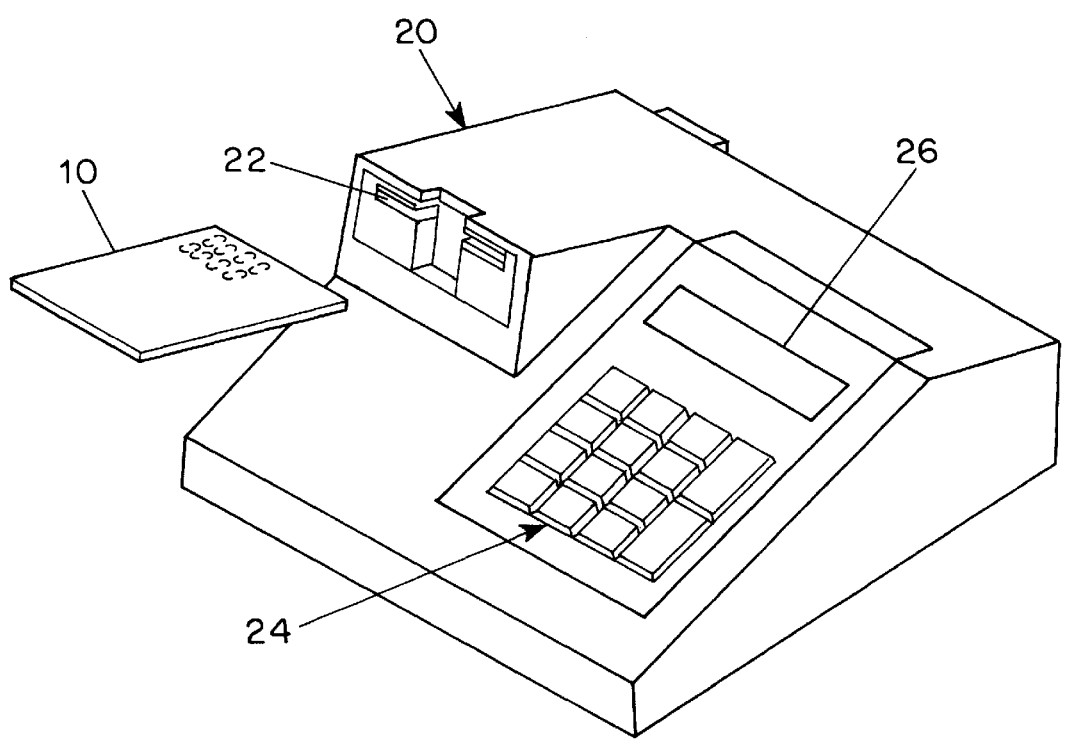
FIG. 2 is an isometric view of an IC card and terminal in accordance with a preferred embodiment of the present invention.

FIG. 2 shows an example of a device with which the IC card 10 communicates. As used in this specification and the appended claims, the term "terminal" shall be used to generically describe devices with which an IC card may communicate. A typical terminal 20, as shown in FIG. 2, includes a card reader 22, a keypad 24, and a display 26. The keypad 24 and the display 26 allow a user of the IC card 10 to interact with the terminal. The keypad 24 allows the user to select a transaction, to enter a personal identification number ("PIN"), and to enter transactional information. The display 26 allows the user to receive informational messages and prompts for data entry.

Figure 3:
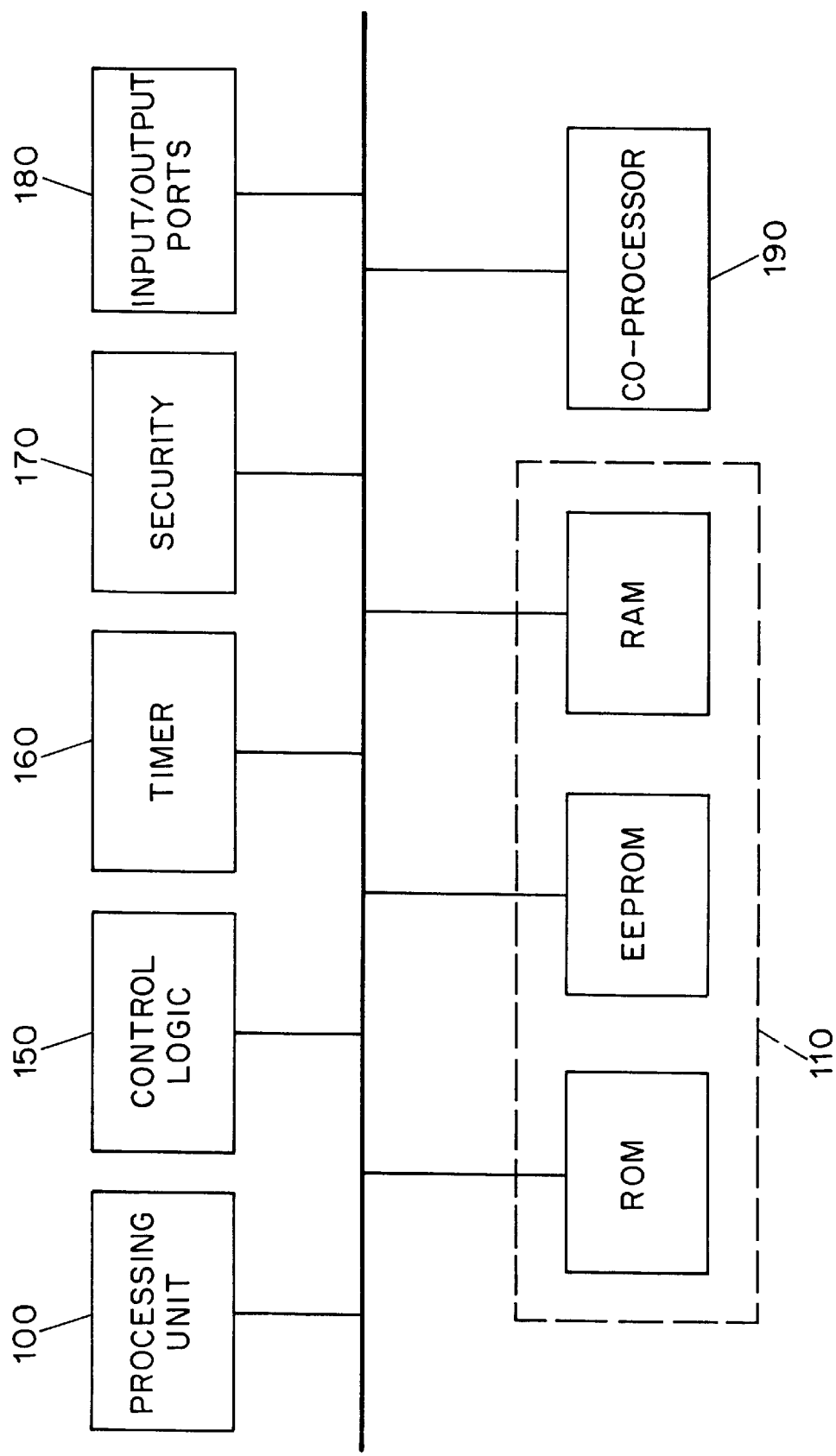
FIG. 3 is a functional block diagram of an IC card in accordance with a preferred embodiment of the present invention.

FIG. 3 provides a functional block diagram of the integrated circuit 12. At a minimum, the integrated circuit 12 includes a processing unit 100 and a memory unit 110. Preferably, the integrated circuit 12 also includes control logic 150, a timer 160, security circuitry 170, input/output ports 180, and a co-processor 190. The control logic 150 provides, in conjunction with the processing unit 100, the control necessary to handle communications between the memory unit 110 and input/output ports 180. The timer 160 provides a timing reference signal for the processing unit 100 and the control logic 150. The security circuitry 170 provides fusible links that connect the input/output ports 180 to internal circuitry for testing during manufacturing, but which fusible links are burned after completion of testing to limit later access to sensitive circuit areas. The co-processor 190 provides the ability to perform complex computations in real time, such as those required by cryptographic algorithms.

The memory unit 110 may include different types of memory, such as volatile and non-volatile memory and read-only and programmable memory. For example, as shown in FIG. 3, the memory unit 110 may include read-only memory ("ROM"), electrically erasable programmable read-only memory ("EEPROM"), and random-access memory ("RAM").

Figure 4:
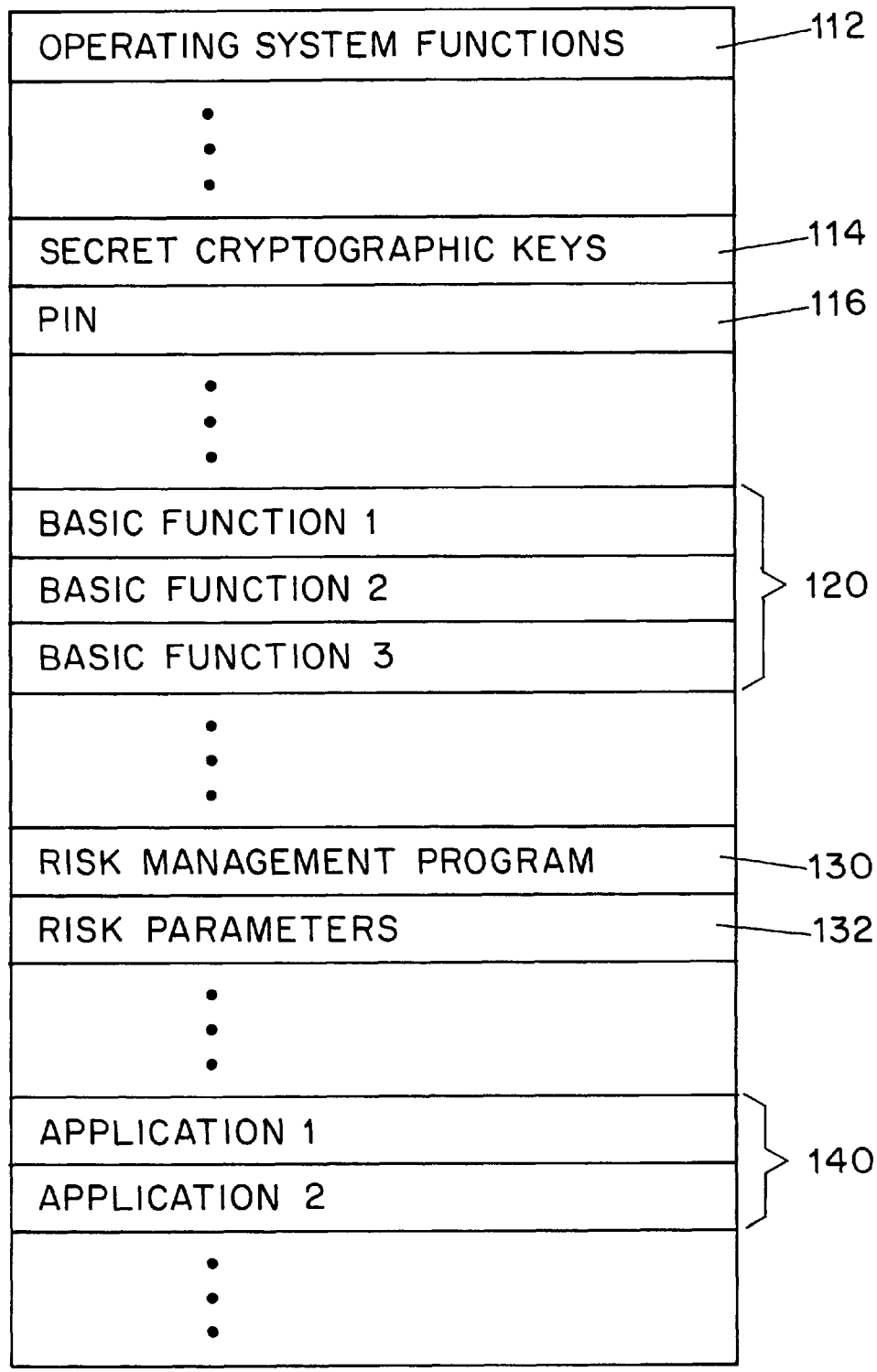
FIG. 4 is a diagram of the memory unit of an IC card in accordance with a preferred embodiment of the present invention.

FIG. 4 is a diagram of an exemplary embodiment of the memory unit 110. As shown in FIG. 4, the memory unit 110 stores the operating system 112 of the IC card 10. The operating system provides file management and other basic card services to IC card applications. Preferably, the operating system is stored in ROM.

The memory unit 110 may also store secret cryptographic keys 114 and a user PIN 116. The secret cryptographic keys may be any type of well-known cryptographic keys, such as the private keys of public-key pairs. Preferably, the secret cryptographic keys are stored in a secure area of the memory unit 110 that is either not accessible or has very limited accessibility from outside the IC card 10.

The memory unit 110 may further include a plurality of basic functions 120 supported by the IC card 10. These basic functions 120 may be stored in either ROM or EEPROM. Table 1 provides a list of exemplary basic functions that may be supported by the IC card 10.

TABLE 1

| Function | Description |
| --- | --- |
| APPLICATION LOCK | This function invalidates a selected application. |
| CARD LOCK | This function permanently disables all applications in the IC card. |
| GENERATE CRYPTOGRAM | This function generates a cryptogram, using the IC card's secret cryptographic key, from transaction-related data. |
| PIN UNLOCK | This function rehabilitates access to the IC card after access has been denied as a result of an invalid PIN being entered too many times. |
| READ RECORD | This function reads application files. |
| SELECT APPLICATION | This function selects applications. |
| VERIFY PIN | This function verifies a PIN provided by a user against the PIN stored in the IC card. |

The functions listed in Table 1 are derived from the EMV '96 Integrated Circuit Card Specification for Payment Systems, Version 3.0, Jun. 30, 1996, available from MasterCard International Incorporated. These functions and others are described in greater detail in that specification, which is incorporated herein by reference in its entirety.

In addition to the basic functions 120, the memory unit 110 may also include one or more application functions 140 that may be specific to particular parties transacting business with the IC card. For example, if the IC card is to be used as a cash card, an application function called LOAD CREDIT might be included, which loads a credit of a certain currency from a user's account in a financial institution onto the IC card. As with the basic functions 120, the application functions 140 may be stored in either ROM or EEPROM.

Furthermore, in accordance with the present invention, the memory unit 110 includes a risk management program 130 and risk parameters 132 stored therein. The risk management program 130 specifies the methodology to be employed by the processing unit 100 of the IC card 10 in analyzing the risk of transactions for fraud. In determining the risk of fraud with regard to a transaction, the risk management program 130 utilizes the risk parameters 132 stored in the memory unit 110. The risk management program 130 and risk parameters 132 may be stored in either ROM or EEPROM.

Figure 5:
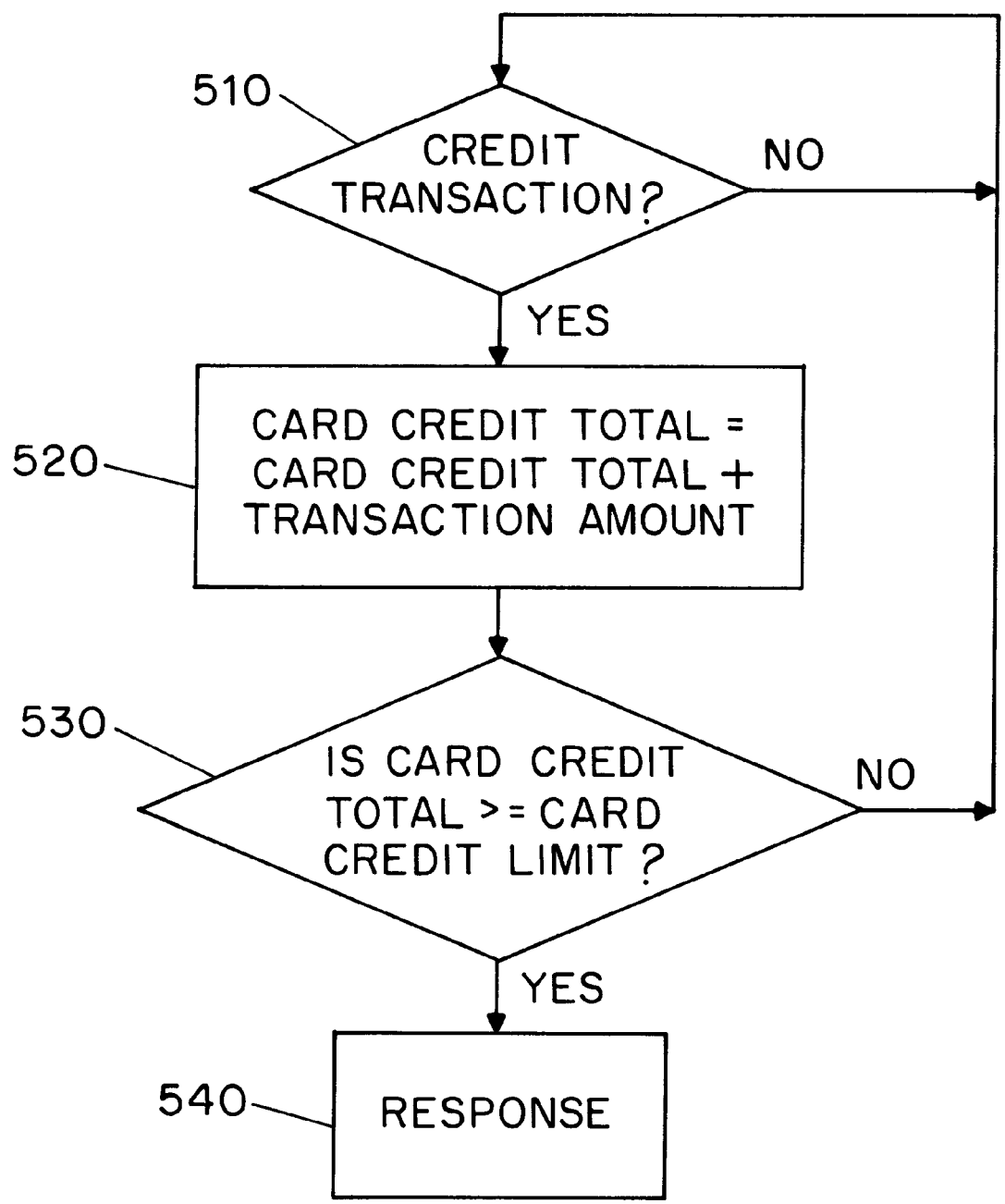
FIG. 5 is flowchart of a risk management methodology used in accordance with a preferred embodiment of the present invention.

FIG. 5 provides a flowchart of a first embodiment of a risk management program 130 that may be used in accordance with the present invention. The risk parameters used with the embodiment of FIG. 5 include a card credit limit and a card credit total. The card credit limit specifies the maximum value that can be cumulatively credited to the IC card 10. The card credit total keeps track of the total value credited to the IC card 10. In step 510, the IC card checks if the transaction is a credit transaction. If the transaction is a credit transaction, the card credit total is incremented by the amount of the transaction in step 520. In step 530, the card credit total is compared to the card credit limit. When the card credit total equals or exceeds the card credit limit, potential fraud is detected and the IC card 10 takes an appropriate response in step 540.

An appropriate response may include, for example, locking out further credit transactions. Credit transactions may be locked out by using, for example, the APPLICATION LOCK function of the IC card discussed earlier. Alternatively, more drastic measures may be taken, such as locking out the entire IC card. The IC card may be locked out by using the CARD LOCK function of the IC card discussed earlier. When an IC card or an application is locked out, a user must typically return the IC card to the issuer to have the card or application unlocked. When the IC card is returned to the issuer, the issuer may conduct further analysis for fraud.

Figure 6:
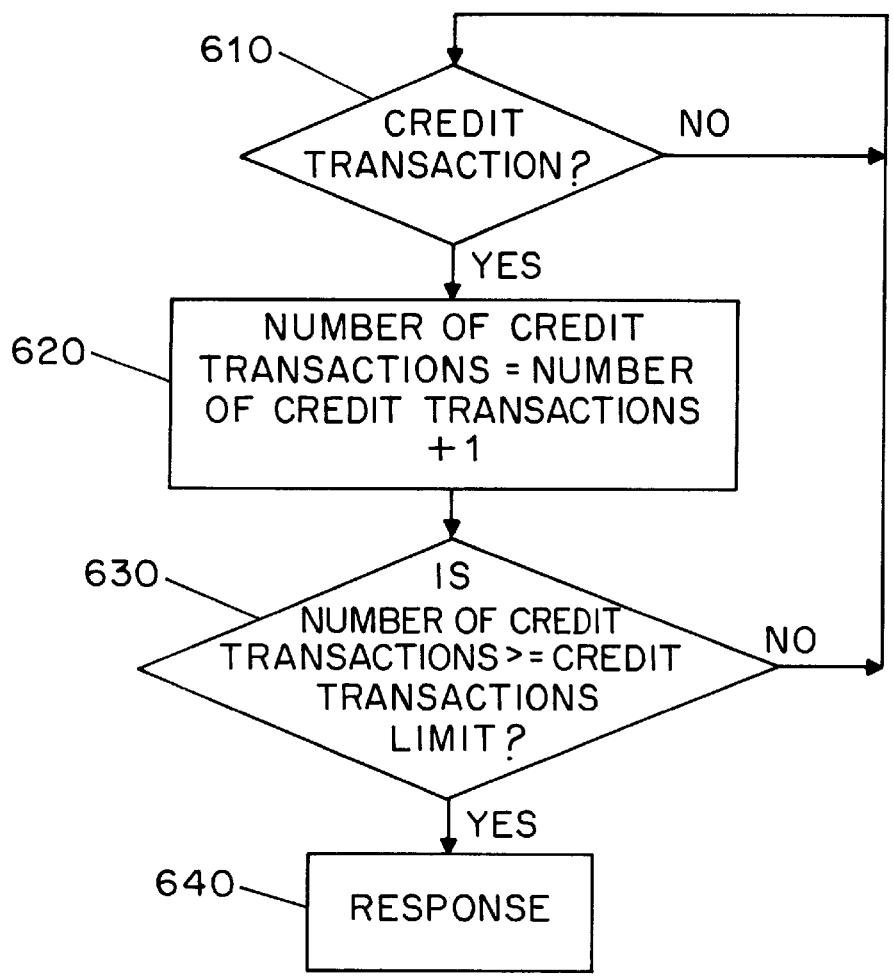
FIG. 6 is a flowchart of another risk management methodology used in accordance with another preferred embodiment of the present invention.

FIG. 6 illustrates a second embodiment of a risk management methodology 130 that may be used in accordance with the present invention. The risk parameters used in the embodiment of FIG. 6 limit the number of credit transactions that may be performed by the IC card. In step 610, the IC card checks if the transaction is a credit transaction. If it is, the number of number of credit transactions is incremented by one in step 620. In step 630, the number of credit transactions is compared to the credit transactions limit. If the number of credit transactions is equal to or greater than the credit transactions limit, the IC card takes an appropriate response, such as locking the currently selected application or locking the IC card.

Figure 7:
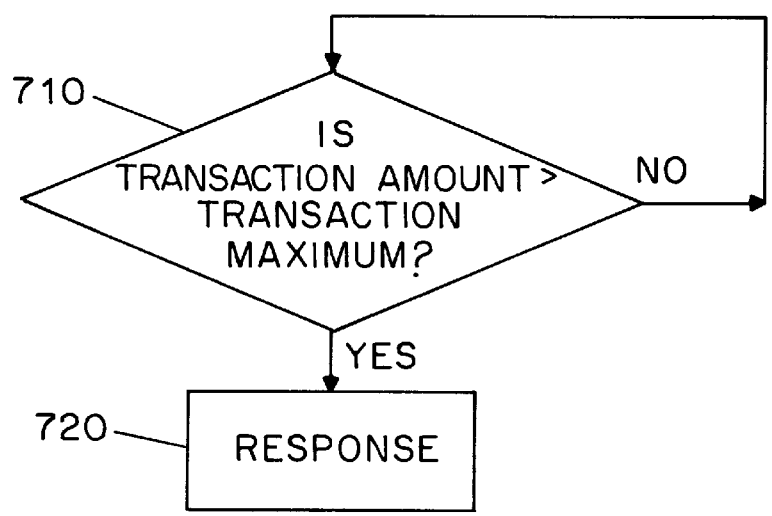
FIG. 7 is a flowchart of another risk management methodology used in accordance with another preferred embodiment of the present invention.

FIG. 7 illustrates a third embodiment of a risk management methodology 130 that may be used in accordance with the present invention. The risk parameter used in this embodiment is a transaction amount limit per transaction. In step 710, the transaction amount of the transaction to be conducted by the IC card is compared to the transaction amount limit per transaction. If the transaction amount exceeds the limit, an appropriate response is taken in step 720.

Figure 8A:
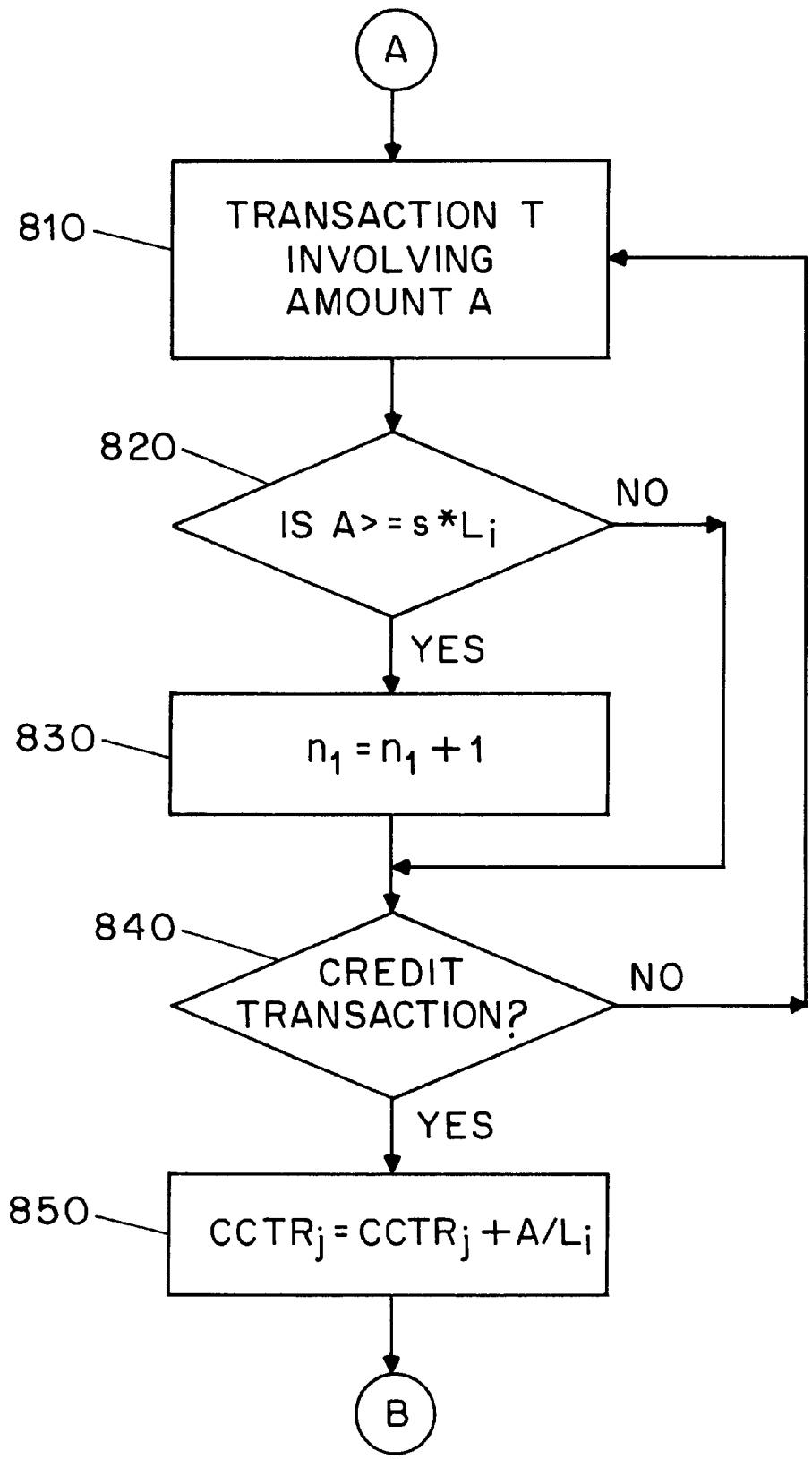
FIGS. 8A and 8B provide a flowchart of another risk management methodology used in accordance with another preferred embodiment of the present invention.
Figure 8B:
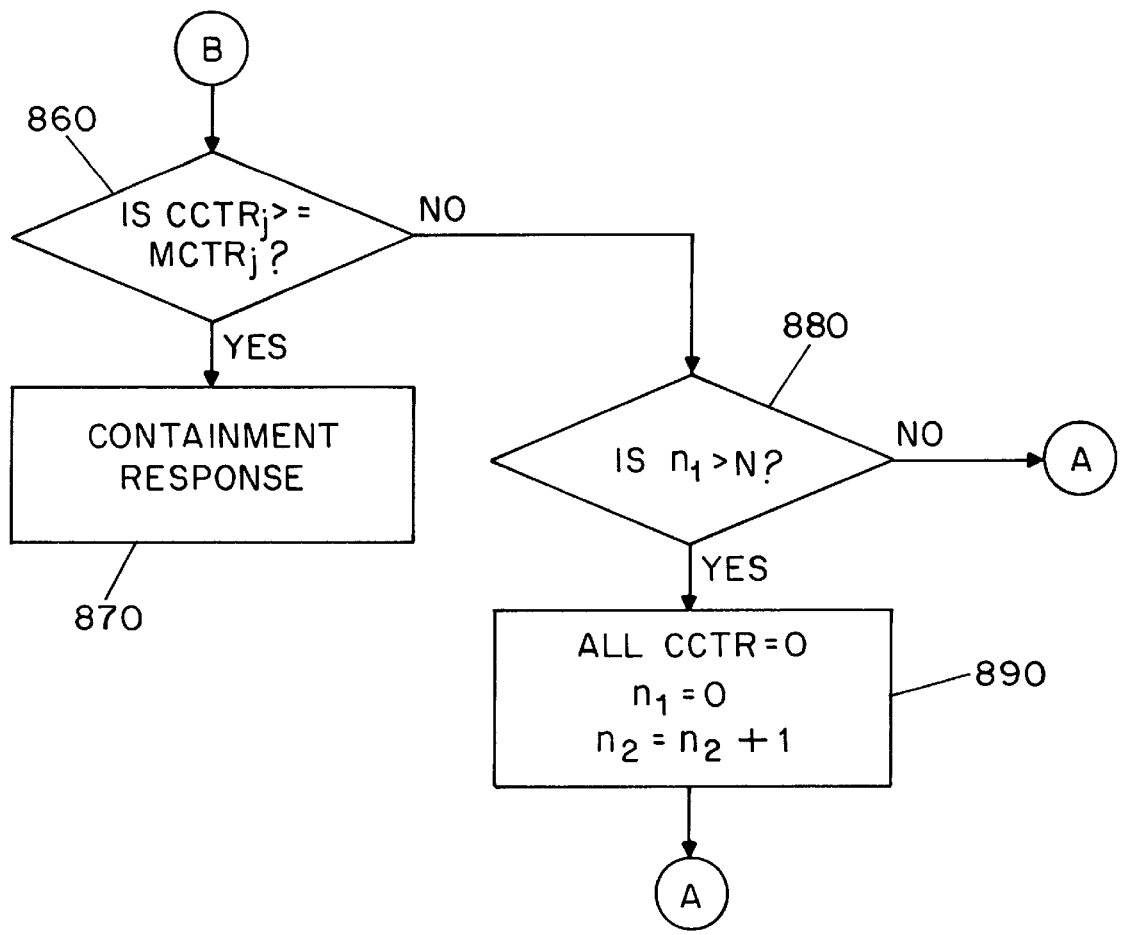

FIGS. 8A and 8B illustrate a fourth and preferred embodiment of a risk management methodology 130 that may be used in accordance with the present invention. Table 2 lists the risk parameters used with the embodiment of FIGS. 8A and 8B. This embodiment utilizes a transaction turnover ratio, which is the ratio of the amount of a transaction to an IC card transaction amount limit. Specifically, the embodiment of FIGS. 8A and 8B utilizes a credit turnover ratio. Of course, the claimed invention is not limited to such a ratio, but may encompass any transaction turnover ratio. For example, a debit turnover ratio may also be used in accordance with the present invention.

Advantageously, because a transaction turnover ratio is currency neutral (being the ratio of two amounts), a single ratio may be used for an entire IC card, regardless of the number of currencies supported by the IC card. The use of a single ratio enables control of the total spending pattern of an IC card without performing currency exchange-rate calculations.

In addition to the use of a transaction turnover ratio, the embodiment of FIGS. 8A and 8B demonstrates the use of several other advantageous features that may be used in accordance with the present invention. First, it may be advantageous to maintain separate ratios for different transaction types. For example, separate ratios may be maintained for on-host and off-host transactions, where on-host transactions refer to the transactions performed between consumers and IC-card issuing institutions and off-host transactions refer to transactions performed between consumers and merchants or consumers and consumers.

Second, it may be advantageous to include a transaction counter $n_1$ and a reset interval N as part of the risk parameters. The transaction counter and reset interval allow the IC card to reset relevant risk parameters after a predetermined number of transactions has been performed. This feature enables risk management to be utilized on an IC card without the periodic intervention of an issuing institution to reset the risk parameters stored on the IC card.

Third, it may be advantageous to include a minimum transaction size among the risk parameters. The minimum transaction size prevents small transactions from being counted toward the reset count mentioned above.

TABLE 2

| Risk Parameters | Description |
| --- | --- |
| $L_1, L_2, L_3, \ldots$ | IC card transaction limits for each currency supported by the IC card |
| $MCTR_1, MCTR_2, MCTR_3, \ldots$ | Maximum Credit Turnover Ratios (cumulative) for each of a transaction type specified by the IC card issuer |
| $CCTR_1, CCTR_2, CCTR_3, \ldots$ | Current Credit Turnover Ratios for each of a transaction type specified by the IC card issuer |
| s | Minimum transaction size (by percentage or ratio) |
| N | Number of transactions per reset (reset interval) |
| $n_1$ | Number of transactions greater than transaction size |
| $n_2$ | Number of resets |
| R | Response option |

Referring now to FIGS. 8A and 8B, in step 810, a transaction T is initiated involving amount A. In step 820, $L_i$, the card transaction limit corresponding to the currency of transaction T, is retrieved. The risk parameter s is also retrieved, and the amount $s*L_i$ is then calculated, which corresponds to the minimum transaction amount that is countable for the currency of transaction T. The amount $s*L_i$ is compared to the amount A. If the amount A is greater than or equal to $s*L_i$, the transaction counter $n_1$ is incremented by one in step 830. In step 840, it is determined if the transaction is a credit transaction. If it is, processing proceeds to step 850; otherwise, processing restarts at step 810, waiting for the next transaction.

In step 850, the current credit turnover ratio $CCTR_j$ for the current transaction type is retrieved. After $CCTR_j$ is retrieved, the turnover ratio $A/L_i$ is calculated and is added to $CCTR_j$. In step 860, $CCTR_j$ is compared to the maximum credit turnover ratio $MCTR_j$. If $CCTR_j$ is greater than or equal to $MCTR_j$, the containment response indicated by the parameter R is taken in step 870.

If $CCTR_j$ is less than $MCTR_j$ in step 860, the transaction count $n_1$ is compared to the reset interval N in step 880. If $n_1$ is greater than N, the transaction count $n_1$ and all of the current turnover credit ratios are reset to zero in step 890. Preferably, a reset counter $n_2$ is maintained, which is incremented each time a reset occurs in step 890. Advantageously, by maintaining a reset counter, an IC-card issuer may read this information from issued IC cards and perform statistical analysis of the reset counter values for different groups of cards. Subsequently, the value of an IC card's reset counter may be compared to the statistical value calculated for its peer group, and if the value is abnormal, potential fraud may be detected.

Instead of using a transaction counter and a reset interval to allow an IC card to reset relevant risk parameters, the risk parameters may be reset when the IC card communicates with a terminal in contact with the host system of the issuer of the IC card. For example, the risk parameters of an IC card may be reset when the card is inserted into an automated teller machine ("ATM") to load value onto the card. Advantageously, this embodiment requires an IC card user to periodically communicate with the host system of the issuer, at which time the host system may extract information from the IC card for analysis.

As discussed earlier, containment responses to the detection of fraud may include locking an IC card application and/or locking the IC card itself. It is preferred that, whenever an application or card is locked out, a lock activation log be created containing information about the IC card and the transaction that caused the lock-out response. Since it may be possible to have an IC card trigger multiple application lock-out responses, it is also preferable that an IC card lock-out be generated after a predetermined number of lock activation logs are created.

It is further preferred that the lock activation logs be created in both the IC card causing the lock-out condition and in the device transacting business with the IC card. Such a device, of course, may be another IC card. In this embodiment, even if a counterfeiter discards a locked-out IC card, a log of the fraudulent IC card and transaction is maintained by a legitimate party for later analysis.

The creation of a lock activation log in the device transacting business with the IC card causing the lock-out condition may be performed by either sending a copy of the lock activation log to the device or by sending a signal to the device to create a lock activation log itself. In either case, it is also preferred that a write-success flag be included in the memory unit 110 of the IC card 10 causing the lock-out condition, which records whether the writing of the lock activation log in the second device was successful. In this way, if a counterfeiter causes a legitimate card to lock-out, a record is kept whether the writing of the lock activation log was successful in the device that caused the IC card to lock-out. This information may be helpful in determining whether the lock-out was caused by a fraudulent transaction.

Figure 9:
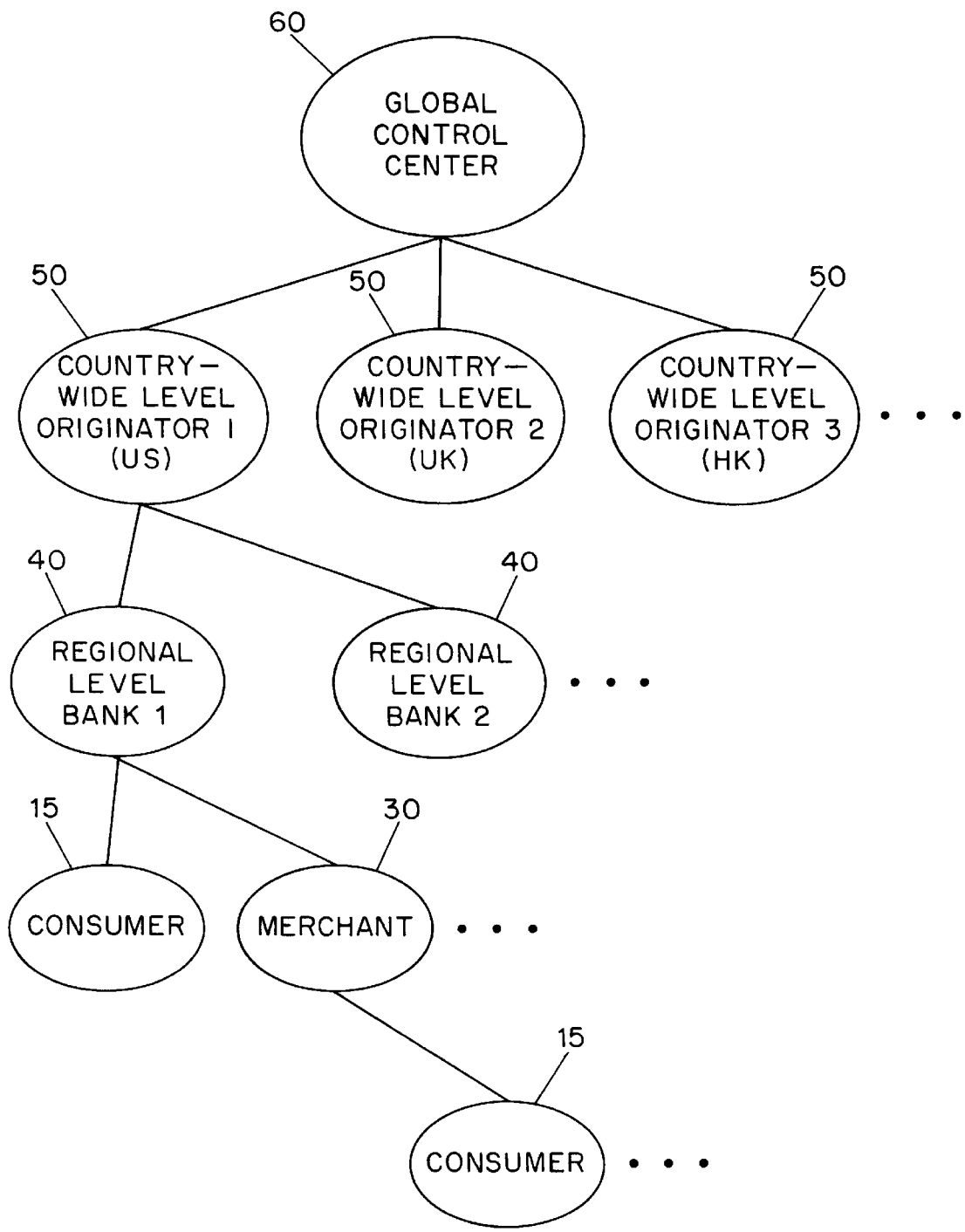
FIG. 9 is a diagram of a hierarchal IC card system in accordance with a preferred embodiment of the present invention.

By storing risk parameters and risk management functionality on an IC card in accordance with the present invention, dynamic re-customization of risk parameters is also possible, which facilitates the containment of fraud. FIG. 9 shows a diagram of a typical hierarchal infrastructure supporting an IC card system. At the highest hierarchal level is a global control center 60. Below the global control center are country-wide originators 50, for each country in which the IC card system is in operation. Below the country-wide originators 50 are regional entities 40, such as banks. Below the regional entities 40 are the local merchants 30 and consumers 15.

Once potential fraud is detected, either by the risk management functionality on the IC cards or by traditional risk management approaches, the information is transmitted up through the hierarchal system to the global control center 60. The global control center 60 analyzes the information and determines if new risk parameters are appropriate to contain the potential fraud. If new risk parameters are appropriate, they are cascaded down the hierarchal system to the IC cards 10 held by the consumers 15. In this way, the risk parameters on the IC cards are dynamically re-customized depending on the magnitude and type of fraudulent threat detected.

To increase the efficiency of the containment response and minimize the inconvenience to legitimate IC card users, the re-customization of risk parameters may also be selectively targeted to certain groups of IC cards. To implement selective targeting of dynamic re-customization, an IC card must contain classification fields for the characteristics that are sought to be selectively targeted. Examples of such classification fields are listed in Table 3.

TABLE 3

| Classification Field | Description |
| --- | --- |
| Country ID | Identifies the country of residence of the IC card holder |
| Regional ID | Identifies the region of residence of the IC card holder |
| Member ID | Identifies the particular member (bank) that issued the IC card |
| City ID | Identifies the city of residence of the IC card holder |
| Card ID | Identifies each specific IC card |
| Group ID | Identifies other relevant characteristics (e.g., urban/suburban dweller) |
| Currency ID | Identifies the currencies supported by the IC card |
| Cross-Border Flag | Identifies whether the IC card may perform cross-border transactions (may be utilized for various territorial levels) |
| Cross-Group Flag | Identifies whether the IC card may perform transactions with IC cards outside of its group |
| Consumer-to-Consumer Flag | Identifies whether the IC card may perform consumer-to-consumer transactions |

Figure 10:
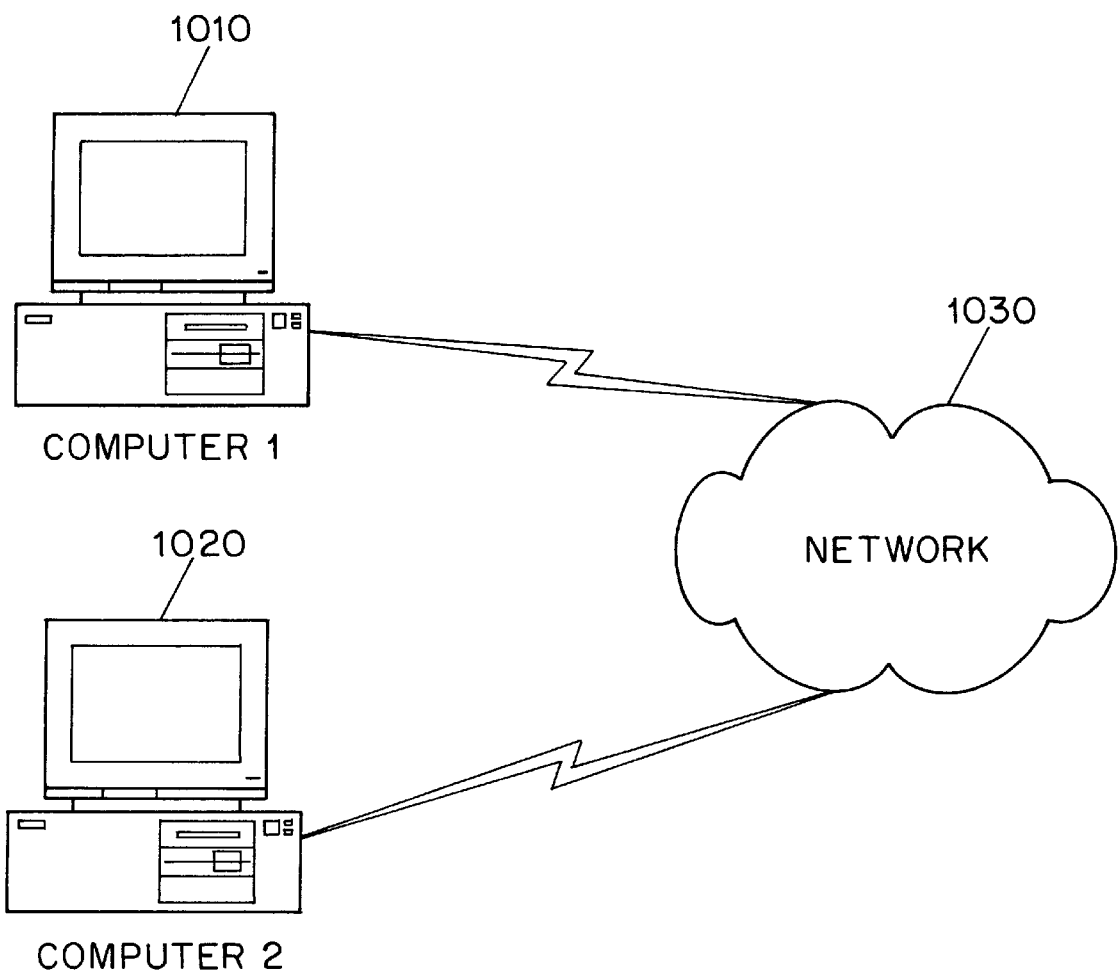
FIG. 10 is a diagram of a computer conducting transactions on a network in accordance with a preferred embodiment of the present invention.

FIG. 10 illustrates a preferred embodiment of the present invention, in which the microprocessor-based devices used in conducting transactions are general purpose computers. In this embodiment, a first computer 1010 is engaged in electronic commerce with a second computer 1020 through a network 1030, which may be, for example, the Internet. The computers 1010 and 1020 have stored therein PINs, cryptographic keys, and application software for conducting transactions. In addition, the computers 1010 and 1020 have stored therein risk parameters and risk management functionality as described above, which enables them to perform real-time risk management analysis of the transactions they conduct.

Although the present invention has been described with reference to certain preferred embodiments, various modifications, alterations, and substitutions will be known or obvious to those skilled in the art without departing from the spirit and scope of the invention, as defined by the appended claims. For instance, although in the examples provided above, the risk parameters have been directed to credit transactions, the risk parameters may also be directed to debit or other transactions.

We claim:

1. An IC card comprising:
   a memory unit having stored therein one or more risk parameters, wherein at least one of said risk parameters is not a personal identification number(PIN); and
   a processing unit operatively coupled to said memory unit for performing real-time risk management analysis of transactions performed by said IC card using said one or more risk parameters.

2. The IC card of claim 1, wherein said processing unit comprises means for resetting said one or more risk parameters when said IC card is in communication with a terminal in contact with a host system of an issuer of said IC card.

3. The IC card of claim 1, wherein said risk parameters comprise a cumulative transaction amount total and a cumulative transaction amount limit; and wherein said processing unit comprises means for updating said cumulative transaction amount total with the amount of a transaction performed by said IC card and means for comparing said cumulative transaction amount total to said cumulative transaction amount limit.

4. The IC card of claim 1, wherein said risk parameters comprise a number of transactions counter and a number of transactions limit; and wherein said processing unit comprises means for updating said number of transactions counter based on the number of transactions performed by said IC card and means for comparing said number of transactions counter to said number of transactions limit.

5. The IC card of claim 1, wherein said risk parameters comprise a transaction amount limit per transaction; and wherein said processing unit comprises means for comparing the amount of a transaction performed by said IC card to said transaction amount limit per transaction.

6. The IC card of claim 1, wherein the risk parameters comprise one or more transaction turnover ratios.

7. The IC card of claim 6, wherein said one or more transaction turnover ratios are credit turnover ratios.

8. The IC card of claim 6, wherein said one or more transaction turnover ratios are debit turnover ratios.

9. The IC card of claim 1, wherein said risk parameters comprise a transaction amount limit, a transaction turnover ratio limit, and a current transaction turnover ratio; and wherein said processing unit comprises first processing means for computing the ratio of the amount of a transaction performed by said IC card to said transaction amount limit, second processing means for updating said current transaction turnover ratio with said ratio computed by said first processing means, and third processing means for comparing said current transaction turnover ratio with said transaction turnover ratio limit.

10. The IC card of claim 1, wherein the risk parameters comprise:
   one or more transaction amount limits, each transaction amount limit corresponding to a transaction currency;
   one or more transaction turnover ratio limits, each turnover ratio limit corresponding to a transaction type;
   one or more current transaction turnover ratios, each current transaction turnover ratio corresponding to a transaction type;
   and wherein said processing unit comprises:
      computing means for computing the ratio of the amount of a transaction performed by said IC card to the transaction amount limit corresponding to the transaction currency of said transaction;
      first updating means for updating the current transaction turnover ratio corresponding to the transaction type for said transaction with said ratio computed by said computing means; and
      first comparing means for comparing said current transaction turnover ratio with said turnover ratio limit corresponding to the transaction type of said transaction.

11. The IC card of claim 10, wherein said risk parameters further comprise a transaction counter; and wherein said processing unit further comprises second updating means for updating the transaction counter based on the number of transactions performed by said IC card.

12. The IC card of claim 11, wherein said risk parameters further comprise a reset interval; and wherein said processing unit further comprises second comparing means for comparing said transaction counter with said reset interval and reset means for resetting said transaction counter and said one or more current transaction turnover ratios based on the result of the said second comparing means.

13. The IC card of claim 12, wherein said risk parameters further comprise a reset counter; and wherein said processing unit further comprises third updating means for updating said reset counter each time said transaction counter is reset.

14. The IC card of claim 12, wherein said risk parameters further comprise transaction qualification parameters; and wherein said processing unit further comprises means for determining whether a transaction performed by said IC card satisfies said transaction qualification parameters and means for bypassing said second updating means if said transaction does not satisfy said transaction qualification parameters.

15. The IC card of claim 13, wherein said processing unit further comprises disabling means for disabling at least part of the functionality of said IC card based on the results of said first comparing means.

16. The IC card of claim 15, wherein said memory unit further comprises lock activation log areas for writing a lock activation log each time said disabling means disables at least part of the functionality of the IC card.

17. The IC card of claim 16, wherein said processing unit further comprises means for disabling the entire functionality of the IC card when a predetermined number of said lock activation logs are written into said log activation log areas.

18. A method for conducting a transaction with an IC card, said IC card having a memory unit with one or more risk parameters stored therein, wherein at least one of said risk parameters is not a personal identification number (PIN), the method comprising:

initiating a transaction with said IC card;

performing real-time risk management analysis of said transaction using said one or more risk management parameters; and completing said transaction based on the results of said risk management analysis.

19. A method for detecting fraud within an IC card system comprising a plurality of IC cards, each IC card comprising a memory area for storing one or more risk parameters, wherein at least one of said risk parameters is not a personal identification number (PIN), and a processing unit for performing real-time risk management analysis of transactions using said risk parameters; the method comprising:

reading one or more of said risk parameters from one or more of said IC cards;

performing statistical analysis on the read risk parameters; and comparing the results of said statistical analysis with one or more of said risk parameters of one or more of said IC cards.

20. A method for performing a transaction between an IC card and a compatible device, said IC card comprising a memory unit and a processing unit, said memory unit having one or more risk parameters stored therein and one or more lock activation log areas for storing lock activation logs; said method comprising:

detecting potential fraud by performing real-time risk management analysis of said transaction using said risk parameters by said processing unit;

writing a lock activation log in one of said log activation log areas; and transmitting a signal to said compatible device to write a lock activation log in said compatible device.

21. The method of claim 20, wherein said compatible device is an IC card.

22. The method of claim 20, wherein said step of transmitting a signal comprises transmitting a copy of the lock activation log written in said one of said lock activation log areas in said IC card.

23. The method of claim 20, wherein said step of transmitting a signal comprises transmitting a signal instructing said compatible device to create a lock activation log.

24. The method of claim 20, wherein said memory unit further comprises a write-success flag area; said method further comprising the step of:

writing a positive indication in said write-success flag area if said compatible device indicates said lock activation log was successfully written, or writing a negative indication in said write-success flag area if said compatible device indicates said lock activation log was not written or said compatible device does not respond to said transmitting step.

25. A method for containing potentially fraudulent transactions in an IC card system comprising one or more IC cards, each IC card comprising a memory unit having risk parameters stored therein, wherein at least one of said risk parameters is not a personal identification number (PIN), and a processing unit for performing real-time risk management analysis of transactions using said risk parameters, and one or more terminals for communicating with said one or more IC cards; the method comprising:

detecting potentially fraudulent transactions involving one or more of said IC cards; and transmitting commands to said one or more IC cards through said one or more terminals to change said risk parameters.

26. The method of claim 25, wherein said memory unit further comprises classification fields, and said step of transmitting commands comprises selectively targeting one or more of said IC cards using said classification fields.

27. The method of claim 25, further comprising a hierarchal communications network with a control center connected to the top level of the network and said one or more terminals connected at lower levels of the network below said control center, and wherein said step of transmitting commands comprises transmitting commands from said control center to said one or more IC cards through said hierarchal communications network to change said risk parameters.

* * * * *